United States Patent

Tsuzuki

[11] 4,215,960
[45] Aug. 5, 1980

[54] COPYING-MILLING APPARATUS

[75] Inventor: Yoshihiko Tsuzuki, Nagoya, Japan

[73] Assignee: Toyota Jidosha Kogyo Kabushiki Kaisha, Toyota, Japan

[21] Appl. No.: 881,695

[22] Filed: Feb. 27, 1978

Related U.S. Application Data

[63] Continuation of Ser. No. 805,335, Jun. 10, 1977, abandoned, which is a continuation of Ser. No. 708,623, Jul. 26, 1976, abandoned.

[51] Int. Cl.² .............. B23C 1/16; B23Q 35/20; B23Q 35/30
[52] U.S. Cl. .............. 409/121; 51/100 R; 318/578; 409/127
[58] Field of Search .............. 90/62 R, 13.1, 13.2, 90/13.3, 13.4, 13.5; 51/100 R, 101 R, 281 R; 318/578; 409/98, 99, 107, 109, 114, 121, 127

[56] References Cited

U.S. PATENT DOCUMENTS

| | | |
|---|---|---|
| 2,500,850 | 3/1950 | Miller .............. 90/62 R |
| 2,914,991 | 12/1959 | Scherrer .............. 90/13.1 |
| 3,980,938 | 9/1976 | Nakagoshi et al. .............. 90/62 R X |

FOREIGN PATENT DOCUMENTS 387414 1/1965 Switzerland .............. 90/13.1

Primary Examiner—Z. R. Bilinsky
Attorney, Agent, or Firm—Stevens, Davis, Miller & Mosher

[57] ABSTRACT

Copying-Milling apparatus comprising detectors which detect amounts of displacement of a tracer, a drive device for adjustment which subjects a cutter or the tracer to positioning separately from a motion concerned with the detectors, and control devices which actuate the drive device for adjustment by amounts corresponding to the detection values, so that the motion at the copying-milling is controlled into a motion with a required amount of expansion or contraction taken into consideration.

2 Claims, 5 Drawing Figures

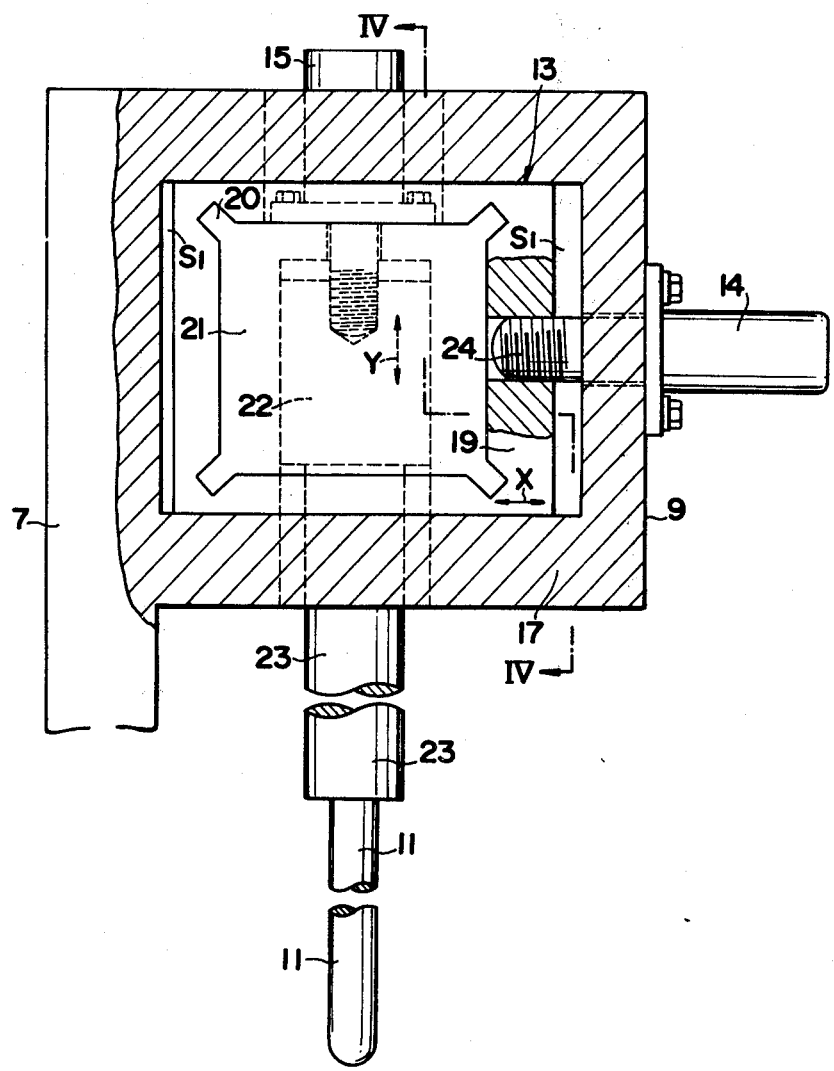

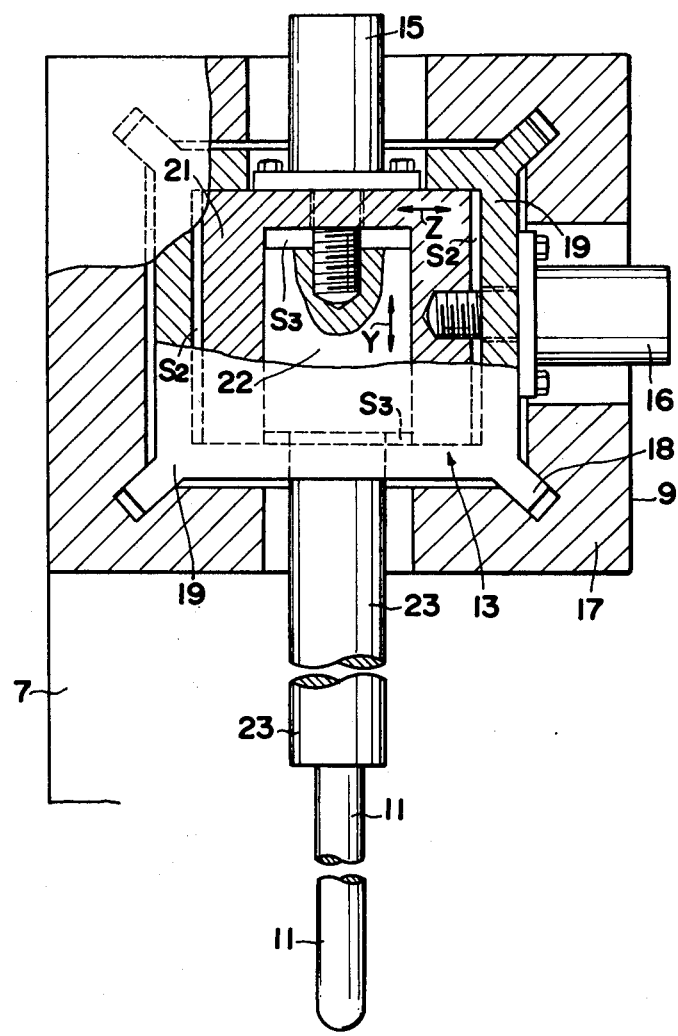

COPYING-MILLING APPARATUS

This is a continuation of application Ser. No. 805,335 filed June 10, 1977, which in turn is a continuation of application Ser. No. 708,623 filed July 26, 1976, both now abandoned.

This invention relates to improvements in copying-milling apparatus for a die casting metal mold, a plastic forming metal mold and other products.

In prior-art copying-milling apparatus, a model for copying-milling and a product to be fabricated are of the same size, i.e., a work having the dimensional relation of 1:1. Where the work is one for use in working under a heated condition, for example, a die casting metal mold, or a plastic forming metal mold, the amount by which a die casting product or a plastic product contracts due to cooling is allowed for, and the copying-milling model fabricated in a larger size beforehand is employed for the copying milling. This is ascribable to the problem that, since the dimensional relationship between the copying-milling model and the work is not 1:1 in the case of the die casting metal mold or the plastic forming metal mold, an absolute coordinate position at which the model is traced and a coordinate position of a point of actual working differ in dependence on a curved surface at all times.

For the above reason, in fabricating the copying-milling model, it is required that an experienced man fabricate the copying milling model into a larger size with the required amount of expansion allowed for on the basis of the shape and size of the final product. Of course, it is possible to construct a three-dimensional copying-milling machine by combining reduced-scale copying-milling machines for two-dimensional quantities. In this case, however, another difficult problem actually occurs on account of the differences among a central tracer position, a central cutter position and a cutter contact. This invention is characterized in that the problems described above have been solved by a simple construction.

In case of products requiring high precision, such as the die casting mold and a forging metal mold, even the copying-milling model owing to the eye-measurement and experience of the experienced man as based on a drawing and the final product model is limited to one in which a plane part, an identical curved surface part or the like is large. Moreover, a precise hand finish job is required. Where, as in case of the plastic forming metal mold, the final product attaches importance to the design factor in the external appearance rather than to the dimensional accuracy, it is the actual situation that even when the product by the metal mold obtained undergoes a contraction deformation and exhibits a difference in dimensions from the product model at the time of the design, the contracted and deformed product is mass-produced as the final one.

The problem of dimensional accuracy in copying-milling increases as the product to be fabricated becomes larger in size, as the working precision becomes higher even if the product is small-sized, and as the amount of thermal deformation of a raw material, in the case of using the product, becomes larger. In particular, the difficulty increases when the product attaches importance to the function and has a great proportion of three-dimensional free curved surface. As a measure for solving the problem, a numerical control system is known. In case of the numerical control system, however, the design of numerical value transformations is required beforehand in order that the milling in a larger size may be made by the use of a model of actual size. Moreover, the setting of numerical values according to various conditions such as the diameter of a stylus is necessary. Thus, a large number of stages of work is involved.

An object of this invention is to provide a copying-milling apparatus wherein a model for copying-milling is fabricated at a dimensional ratio of 1:1 relative to a final product, and the motion of a cutter at the copying-milling can be controlled into a motion with a required amount of expansion or contraction taken into consideration, whereby the product to be fabricated, such as a metal mold, can be automatically worked to size with the required amount of expansion or contraction increased or decreased relative to a size of the copying-milling model.

A further object is to provide a copying-milling apparatus wherein the degree of scale enlargement or reduction can be freely set, so that a product of high precision with a required degree of expansion or contraction added thereto can be copying milled highly efficiently even in case of a shape of large-sized three-dimensional free curved surface, that the enhancement of the precision of the final product and the enhancement of the working property are remarkable and that the cost of the copying-milling is reduced.

Other features and advantages of this invention will become apparent from the following description taken in conjunction with the accompanying drawings, in which:

FIG. 3 is a sectional view of essential portions taken along line III—III in FIG. 1;

FIG. 4 is a sectional view taken along line IV—IV in FIG. 3; and

Figure 1:
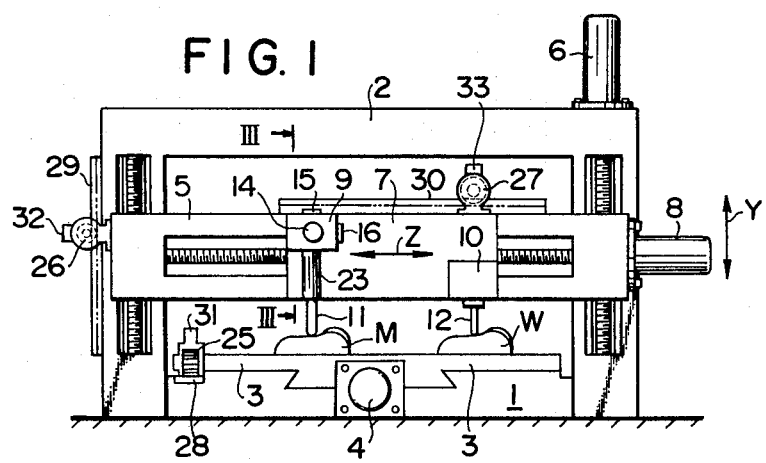
FIG. 1 is a front view of an example of a copying-milling machine to which the apparatus of this invention is applied.
Figure 2:
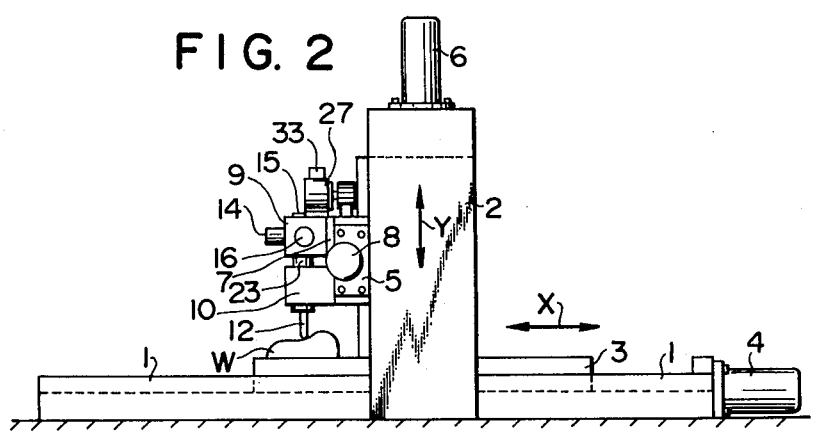
FIG. 2 is a side view of the machine in FIG. 1.

In an embodiment illustrated in FIGS. 1 and 2, the copying-milling apparatus copies and mills a die casting mold as a work W according to a model M, the die casting mold being larger in size than the model M with allowance made for an amount of contraction. The apparatus comprises a bed 1 and a gate-shaped column 2 which are fixed to the floor of a factory. A table 3 is arranged on the bed 1 so as to be slidable in a longitudinal direction thereof, i.e. in the direction X shown in FIG. 2. The table 3 is driven in the X-direction by a pulse motor 4.

A cross girder 5 is arranged on the gate-shaped column 2 so as to be slidable vertically, i.e., in the direction Y in FIG. 1. The cross girder 5 is driven in the Y-direction by a pulse motor 6.

Figure 5:
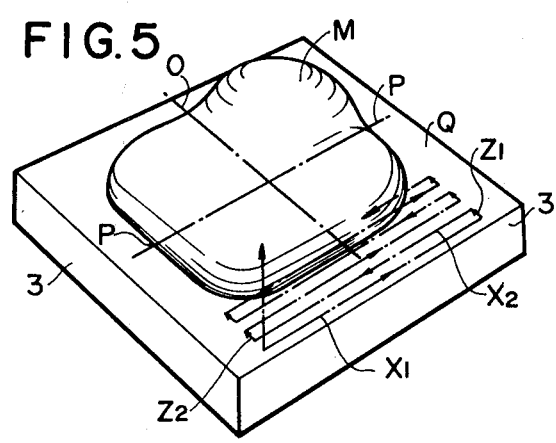
FIG. 5 is a perspective view showing the relationship among a model, a reference point and a working course.

A holder 7 is arranged on the cross girder 5 so as to be slidable in a longitudinal direction of the cross girder 5, i.e., the direction Z in FIG. 5. The holder is driven in the Z-direction by a pulse motor 8. A tracer unit 9 and a cutter unit 10 are secured to the holder 7. A tracer 11 of the tracer unit 9 lies in contact with the model M on the table 3. Upon a signal of the tracer, the respective pulse motors 4, 6 and 8 are driven, and a cutter 12 of the cutter unit 10 copying-mills the work W. The construction described above is the same as in known copying-milling apparatus.

In the illustrated embodiment of this invention, the tracer unit 9 includes therein a drive device for adjustment 13 and control devices 14, 15 and 16 for the individual axial directions X, Y and Z as shown in FIG. 3 and FIG. 4.

The drive device for adjustment 13 is composed of a first inner block 19 which is disposed within an outer block 17 so as to be slidable in the X-direction by a first slide guiding portion 18, a second inner block 21 which is disposed within the first inner block 19 so as to be slidable in the Z-direction by a second slide guiding portion 20, and a third inner block 22 which is disposed within the second inner block 21 so as to be slidable in the Y-direction by a third slide guiding portion having the same construction as that of the slide guiding portion 18 or 20. The tracer 11 and a control signal generating portion 23 therefor are secured to the third inner block 22. The control signal generating portion 23 provides advance and recession signals for the pulse motors 4, 6 and 8 so as to effect the copying-milling.

The first to third inner blocks define a first space $S_1$, a second space $S_2$ and a third space $S_3$ in the respective sliding directions with respect to the outer block 17, the first inner block 19 and the second inner block 21 in which the respective blocks are disposed. The first inner block 19 is threadably engaged with a threaded shaft 24 of the first control device 14 being the pulse motor secured to the outer block 17. By the rotation of the pulse motor of the control device 14, the first inner block is moved forwards and backwards in the X-direction within the range of the space $S_1$.

On the basis of the same mechanism, the second inner block 21 is moved forwards and backwards in the Z-direction within the range of the space $S_2$ by the second control device 16 being the pulse motor, while the third inner block 22 is moved forwards and backwards in the Y-direction within the range of the space $S_3$ by the third control device 15 being the pulse motor.

A first pinion 25, a second pinion 26 and a third pinion 27 are secured to the table 3, the cross girder 5 and the holder 7, respectively. On the other hand, a first rack 28, a second rack 29 and a third rack 30 are secured to the bed 1, the gate-shaped column 2 and the cross girder 5 and are caused to mesh with the pinions 25, 26 and 27, respectively.

The pinions 25, 26 and 27 are additionally provided with detectors 31, 32 and 33 which can detect the respective movement distances of the table 3, the cross girder 5 and the holder 7, i.e., the amounts of displacements in the X-, Y- and Z-directions from reference points to be stated later, so as to generate signals. The detector 31 for detecting the amount of displacement in the X-direction applies the signal to the pulse motor being the control device 14 and drives the device 14 by a corresponding amount. Likewise, the detector 32 can drive the pulse motor being the control device 15, while the detector 33 can drive the pulse motor being the control device 16.

The constructions of the control signal generating portion 23 and the detectors 31, 32 and 33 may be any capable of responding to the amount of displacement and providing the required control signal as used in known copying-milling apparatus. The concrete structures of the signal generating portion as well as the detectors and signal transmitting circuits are omitted from the drawings.

Although, in the present embodiment, the pulse motors are used as the drive sources and control sources, they may well be gear structures to which power is externally transmitted, or any other drive device. In case of the gear structures, the control signal generating portion 23 and the detectors 31, 32 and 33 can be made a turning force-transmitting system which includes an over-drive gear and a reduction gear.

The amounts of displacement which the detectors 31, 32 and 33 are to detect are the amounts of displacement of the tracer from the preset reference points. Where, as in the illustrated embodiment, the die casting mold which is made larger in size than the model M by allowing for the amount of contraction is copying-milled according to the model M, a center line O—O of the model M in the X-direction and a center line P—P in the Z-direction are made the reference points, and the plane Q of the table 3 in the Y-direction is made the reference point. The distances from the respective reference points are detected by the detectors 31, 32 and 33. The detected signals can be always made plus signals and given to the driven device for adjustment 13.

The displacement of the tracer 11 which is moved by the drive device for adjustment 13 on the basis of the signals is given in superposition on the motion, i.e., displacement which is bestowed on the tracer 11 as the original copying-milling operation by the pulse motors 4, 6 and 8.

The function of the apparatus of this invention constructed as described above is as stated below.

Now, consider that the model M arranged on the table 3 is that of a die casting metal mold and that the work W in which the amount of contraction of a die casting blank after casting is taken into account with respect to the model M is copying-milled by milling. When the tracer 11 comes into contact with the model M for the first time, the cutter 12 follows the tracer 11 and transfers to a corresponding position by the operations of the pulse motors 4, 6 and 8, and it starts cutting. Simultaneously therewith, the position of the tracer 11 or the positions of the table 3, the cross girder 5 and the holder 7 are detected by the detectors 31, 32 and 33. On the basis of the detected signals, the respective pulse motors being the control devices 14, 15 and 16 in the adjusting drive device 13 are driven by amounts corresponding to the signals, to move the tracer 11 in the three axial directions X, Y and Z by the drive components of the respective control devices 14, 15 and 16.

Assume that the tracer 11 transfers along a course $X_1$ in FIG. 5 and that it also moves in the Y-direction in the process. Then, in the course $X_1$, the control devices 14 and 15 operate, and variations $\Delta X$ and $\Delta Y$ are superposed on the position of the tracer 11 as given by the pulse motors 4 and 6.

In this case, the contraction of a die casting product is allowed for, and the work W need be copying-milled into a size larger to that extent. Therefore, the variations $\Delta X$ and $\Delta Y$ are added as amounts of enlarged scale in the direction of causing the tracer 11 to go away from the model M.

As regards the addition, the detector 31 and the control device 14 may be caused to store the variations beforehand so that, as illustrated in FIG. 5, they may be added as +(plus) values on both this side and the opposite side of the course $X_1$ with respect to the center line O—O in the X-direction. Moreover, the detector 31 may be set so as to be capable of providing therefrom a signal value 0 (zero) at the position of the center line O—O and a numerical value signal which is great in proportion to the distance from the center line.

In the Y-direction, the detector 32 may be set so as to be capable of providing 0 (zero) at the plane Q of the table 3 and a numerical value signal of +(plus) which is great in proportion to the height from the plane. The control device 15 is caused to store the signals of the detector 32 in advance so that they may be always added as +(plus) values.

After completion of the tracing of the course $X_1$, the tracer 11 is moved by a course $Z_1$ in the Z-direction by the pulse motor 8, and is made ready for the initiation of a course $X_2$.

The movement of the course $Z_1$ by the pulse motor 8 is also detected by the detector 33. As in the foregoing, the detected position is given to the pulse motor being the control device 16 as a signal of +(plus) value which corresponds to the distance from the center line P—P in the Z-direction. It is given as an amount of enlarged scale in the direction in which the tracer 11 goes away from the model.

Thereafter, similar operations are continuously carried out in courses $X_2$, $Z_2$, etc. Eventually, by the cutter 12 which moves following the tracer 11, the work W is finished to the die casting metal mold which is made somewhat larger in size than the model M by allowing for the contraction after the die casting.

The main control of the cutter 12 for the copying-milling by the tracer 11 is effected, as already explained, by the control signal generating portion 23 and the pulse motors 4, 6 and 8 operating in response thereto. Therefore, the addition of the variations $\Delta X$, $\Delta Y$ and $\Delta Z$ is done at every contact position between the tracer 11 and the model M.

The amounts of movement of the tracer 11 or the amounts of enlarged scale which are detected and transmitted as signals by the detectors 31, 32 and 33 which are added by the control devices 14, 15 and 16 on the basis of the signals may be determined beforehand in direct correspondence with the distances from the reference points in consideration of the working condition, material and shape of the mold product being the work and the service condition of the product and may be stored in the detectors in advance. Of course, they may be partially changed.

The above example pertains to the so-called enlarged scale working in which the work W is worked to be larger in size than the model M. However, the reduced scale working in which the work is made smaller conversely can be similarly effected.

When the amount of enlarged scale or the amount of reduced scale to be previously set cannot be precisely grasped, correction workings are performed repeatedly. Thus, a metallic mold or the like which can make a product having a shape very approximate to a model can be easily worked.

Even in case of a working profiling a two-dimensional curved surface, the apparatus of this invention is applicable insofar as a working factor of profiling some three-dimensional indeterminate-form free curved surfaces is contained.

The apparatus of this invention is not restricted only to the system in which, as illustrated in the drawing, the model and the work are arranged on the table and the working is made from above, but it can also be applied to a copying-milling machine in which a model and a work are fixed to an angle plate or the like and the working is done laterally. The drive device for adjustment may be disposed on the cutter side, not on the tracer side.

The apparatus of this invention is constructed and operated as set forth above, and it always makes the model shape the object and executes the enlargement or reduction of the working dimension after the model. Therefore, a metallic mold or the like being a product which faithfully conforms to the model and which is subjected to a scale enlargement or a scale reduction required therefor can be fabricated without the necessity for various transformation stages of work attendant upon the scale enlargement or any skillful technique in the prior art in which a skilled workman gives the degree of expansion or contraction to a wooden pattern or the like on the basis of a drawing by relying on experience perception.

In addition, the degree of scale enlargement of reduction can be freely set. Even in case of the shape of a three-dimensional indeterminate-form free curved surface of large size, a product of high precision with a required degree of expansion and contraction added thereto can be copying-milled highly efficiently. This is very effective to enhance the precision of a final product and to enhance the working property. Another advantage is that the cost of copying-milling can be lowered.

What I claim is:

1. A copying-milling apparatus for a three-dimensional free curved surface having a tracer and a cutter adapted to follow said tracer, said copying-milling apparatus comprising:

detectors which detect amounts of displacement of said tracer from preset reference points in individual directions of axes X, Y and Z of Cartesian coordinates;

a drive device for adjustment which subjects one of said cutter and said tracer to positioning in the respective axial directions X, Y and Z separately from follow-up motion;

first, second and third control devices which actuate said drive device for adjustment by amounts corresponding to the amounts of displacement detected by said detectors; and said drive device for adjustment comprises a a first inner block which is disposed within an outer block of said tracer unit so as to be slidable in the direction X by a slide guiding portion, a second inner block which is disposed within said first inner block so as to be slidable in the direction Z by a second slide guiding portion, and a third inner block which is disposed within said second inner block so as to be slidable in the direction Y by a third slide guiding portion and to which said tracer and a control signal generating portion therefor and secured; said first, second and third inner blocks define first, second and third spaces in the respective sliding directions with respect to said outer block, first inner block and second inner block in which the respective blocks are disposed; said first inner block is threadably engaged with a threaded shaft of said first control device as secured to said outer block, said second inner block is threadably engaged with a threaded shaft of said second control device as secured to said first inner block, and said third inner block is threadably engaged with a threaded shaft of said third control device as secured to said second inner block; and said first, second and third inner blocks are respectively moved forwards and backwards in the directions X, Y and Z within ranges of said first, second and third spaces by control devices.

2. A copying-milling apparatus comprising:

a bed and a gate-shaped column which are fixed to a floor;

a table which is arranged on said bed so as to be slidable in a longitudinal direction X thereof;

a cross girder which is arranged on said gate-shaped column so as to be slidable in a vertical direction Y thereof;

a holder which is arranged on said cross girder so as to be slidable in a longitudinal direction Z thereof;

a tracer unit and a cutter unit which are secured to said holder;

a tracer unit and a cutter unit, one of which comes into contact with a model on said table;

a cutter of said cutter unit that moves to follow the tracer;

first, second and third pinions which are respectively secured to said table, said cross girder and said holder;

a first rack which is secured to said bed and which meshes with said first pinion;

a second rack which is secured to said gate-shaped column and which meshes with said second pinion;

a third rack which is secured to said cross girder and which meshes with said third pinion;

detectors which are respectively attached to said first, second, and third pinions and which detect amounts of displacement of said tracer from preset reference points in individual directions of axes X, Y and Z of Cartesian coordinates;

a drive device for adjustment which subjects one of said cutter and said tracer to positioning in the respective axial directions X, Y and Z separately from followup motion;

first, second, and third control devices which actuate said drive device for adjustment by amounts corresponding to the amounts of displacement detected by said detectors; and said drive device for adjustment comprises a first inner block which is disposed within an outer block of said tracer unit so as to be slidable in the direction X by a slide guiding portion, a second inner block which is disposed within said first inner block so as to be slidable in the direction Z by a second slide guiding portion, and a third inner block which is disposed within said second inner block so as to be slidable in the direction Y by a third slide guiding portion and to which said tracer and a control signal generating portion therefor are secured; said first, second and third inner blocks define first, second and third spaces in the respective sliding directions with respect to said outer block, first inner block and second inner block in which the respective blocks are disposed; said first inner block is threadably engaged with a threaded shaft of said first control device as secured to said outer block, said second inner block is threadably engaged with a threaded shaft of said second control device as secured to said first inner block, and said third inner block is threadably engaged with a threaded shaft of said third control device as secured to said second inner block; and said first, second and third inner blocks are respectively moved forwards and backwards in the directions X, Y and Z within ranges of said first, second and third spaces by said control devices.

* * * * *